United States Patent [19]
Le Bail

[11] Patent Number: 6,151,782
[45] Date of Patent: Nov. 28, 2000

[54] NUTCRACKER

[75] Inventor: Xavier Le Bail, Saint Leu la Foret, France

[73] Assignee: Birambeau SA (Societe Anonyme), Paris, France

[21] Appl. No.: 09/358,436

[22] Filed: Jul. 22, 1999

[30] Foreign Application Priority Data

Jul. 27, 1998 [FR] France .................................. 98 09567

[51] Int. Cl.⁷ .................................................... A47J 43/26
[52] U.S. Cl. .......................................... 30/120.3; 30/120.1
[58] Field of Search ............................... 30/120.1, 120.2, 30/120.3, 120.4, 120.5; 99/568; 81/186, 418, 423, 900

[56] References Cited

U.S. PATENT DOCUMENTS

| | | | |
|---|---|---|---|
| 508,355 | 11/1893 | Streeter et al. | 30/120.3 |
| 641,581 | 1/1900 | Currence | 30/120.3 |
| 660,763 | 10/1900 | Thompson | 30/120.3 |
| 1,134,265 | 4/1915 | Harper | 30/120.3 |
| 1,698,620 | 1/1929 | Clark | 30/120.3 |
| 4,554,737 | 11/1985 | Bartels . | |
| 4,838,155 | 6/1989 | Steffel . | |
| 5,169,076 | 12/1992 | Dols . | |
| 5,566,452 | 10/1996 | Sample | 30/120.2 |

FOREIGN PATENT DOCUMENTS

| | | | |
|---|---|---|---|
| 2902903 | 8/1980 | Germany | 30/120.3 |
| 1929 | 1/1910 | United Kingdom | 81/418 |

*Primary Examiner*—Rinaldi I. Rada
*Assistant Examiner*—Melissa L. Hall
*Attorney, Agent, or Firm*—Young & Thompson

[57] ABSTRACT

A device for cracking the shells of fruit, such as in particular walnuts, of the type comprising two elements adapted to pivot, by one of their respective ends, about a transverse pin, comprising a fruit-gripping area adjacent to the pivot axis in which the fruit, whose shell it is desired to crack, is placed. This device is characterized in that at least the inner face of one of these elements is covered, at least in part, with an elastically deformable product.

14 Claims, 2 Drawing Sheets

NUTCRACKER

FIELD OF THE INVENTION

The present invention relates to a nutcracker, and more precisely to a nutcracker of the pliers type.

BACKGROUND OF THE INVENTION

It is known that such nutcrackers, which are particularly wide-spread in the prior state of the art, are constituted by two slightly incurved arms which are articulated at one of their ends, their free ends forming a lever arm. The fruits whose shell it is desired to crack, such as in particular walnuts or hazelnuts, are placed near the articulation, between the inner faces of the arms, and an effort is exerted on the free ends of said arms, tending to bring them closer together. In order to avoid the fruit which is gripped between these arms sliding inside the latter, the inner face of said arms comprises a rough surface.

Such rough surfaces are usually formed by successive flutings hollowed in the arms. It has been observed that such rough surfaces are sometimes insufficient to ensure hold, without slide, of the fruit between the two pivoting arms, all the more so as, after a certain number of uses, these rough surfaces tend to become blunt due to the abrasive action exerted by the shell of the fruit. It is an object of the present invention to propose a means ensuring efficient hold of the fruit between the arms of the nutcracker.

Another drawback inherent in this type of nutcracker device is that it is difficult for the user to calculate his/her effort so as to crack the shell of the fruit without deteriorating the inside thereof.

In order to avoid such a drawback, stop elements which come into contact with one another when the two arms have been brought as close as possible to each other, have been arranged on the inner faces of the arms. However, it will be understood that such stops can be efficient only insofar as the fruit is held between the arms without slide during actuation, which, unfortunately, is not the case of nutcrackers of the prior state of the art.

It is therefore an object of the present invention to propose such means for holding the fruit inside the arms of a nutcracker.

SUMMARY OF THE INVENTION

To that end, it relates to a device for cracking the shells of fruit, such as in particular walnuts, of the type comprising two elements adapted to pivot, by one of their respective ends, about a transverse pin, comprising a fruit-gripping area adjacent to the pivot axis in which the fruit, whose shell it is desired to crack, is placed, characterized in that at least the inner face of one of these elements is covered, at least in part, with an elastically deformable product. Such a product may in particular be constituted by an elastomer.

In one embodiment of the invention, the inner face of said element has a groove hollowed out therein, in which said elastically deformable product is housed, at least in part. Such an arrangement allows the elastically deformable product to be easily replaced when it is worn out.

When the nutcracker is in rest position, the elastic product preferably projects from the inner face of the element, at least over a part of the width thereof.

In a particularly advantageous embodiment of the invention, the mechanical characteristics of the elastically deformable product and the arrangement thereof inside the hollow will be such that, in work position, the elastic product is retracted in the groove so that the inner face of the element is in contact with the shell of the fruit.

The nutcracker device according to the invention may comprise first stop means limiting the maximum distance between said elements, and second stop means limiting the minimum distance between said elements.

Furthermore, the invention improves the hygiene of this type of device, by isolating the metal constituting the nutcracker from the fruit itself

BRIEF DESCRIPTION OF THE DRAWINGS

The invention will be more readily understood on reading the following description of various forms of embodiment thereof with reference to the accompanying drawings, in which.

DESCRIPTION OF PREFERRED EMBODIMENTS

Figure 1:
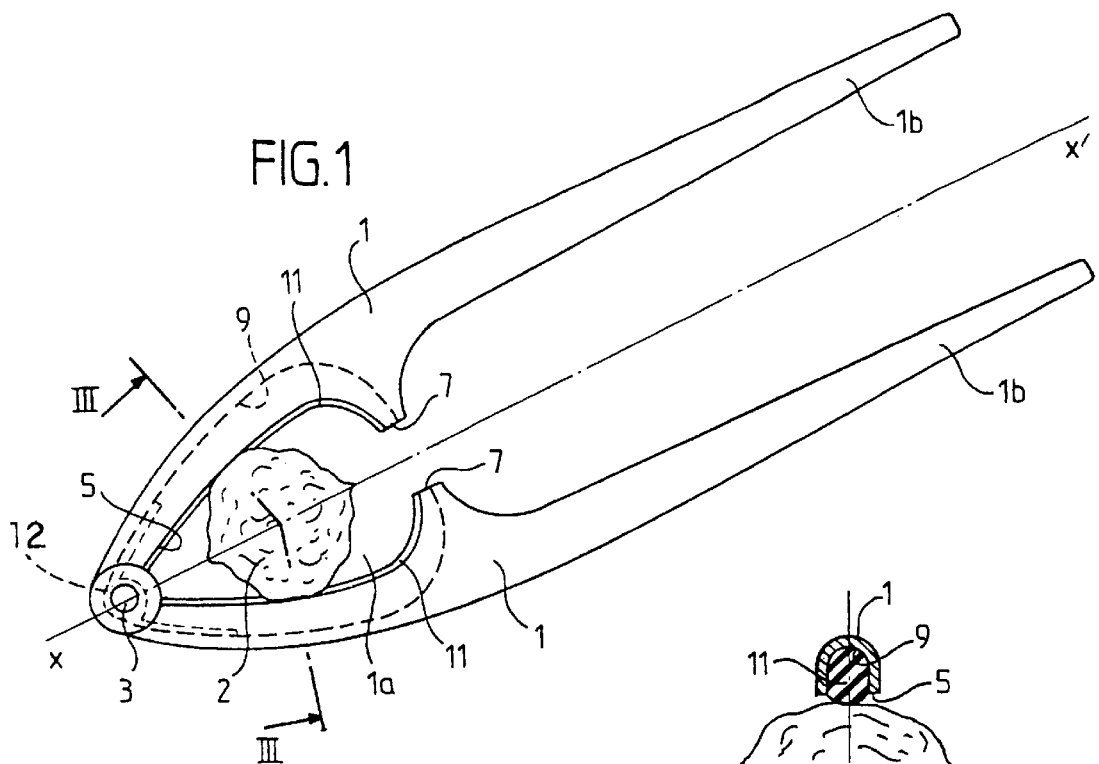
FIG. 1 is a plan view of a nutcracker device according to the invention, in rest position.
Figure 2:
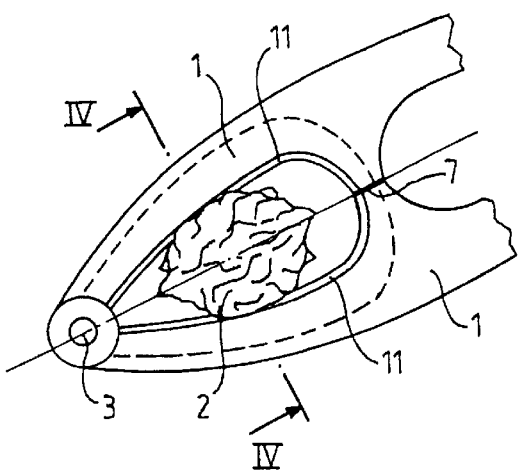
FIG. 2 is a partial plan view of the nutcracker device shown in FIG. 1, in work position.
Figure 4:
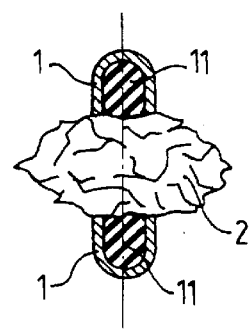
FIG. 4 is a partial view in section of the nutcracker device shown in FIGS. 1 and 2, along line IV—IV of FIG. 2, in work position.

Referring now to the drawings, the nutcracker device shown in FIGS. 1 and 2 is essentially constituted by two identical arms 1 articulated at one of their respective ends on a pin 3. The arms 1 are incurved in their anterior part and extend substantially rectilinearly, in two arms 1b forming levers.

The pin 3 is provided with stop elements 12 which limit the opening of the arms 1 to a maximum value substantially close, as shown in FIG. 1, to about 50°. The two inner faces 5 of the anterior part of the arms 1 thus form a jaw 1a inside which fruit, such as walnuts or hazelnuts 2, of which it is desired to crack the shell, are placed.

The two arms 1 are also provided on their inner face with two stops 7 which form protuberances and which, when the nutcracker is in closed position, come into contact with each other as shown in FIG. 2.

Figure 3:
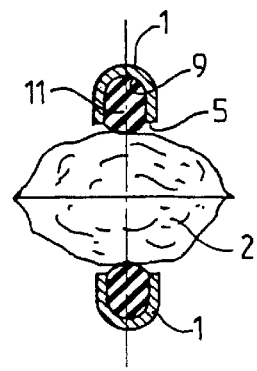
FIG. 3 is a partial view in section of the nutcracker device along line III—III of FIG. 1, with a walnut in place.

The inner faces 5 of the anterior part of the arms 1 which constitute the jaw 1a of the nutcracker device according to the invention, have a longitudinal recess 9 hollowed out therein, inside which is housed an elastomer product 11 which, when the nutcracker is in rest position, i.e. when fruit 2 is not subjected to stress, as shown in FIG. 3, projects from the recess 9.

The elastomer product 11 which is positioned in the recesses 9 of each of the arms 1 is selected for its qualities of adherence with the fruit 2 which it is intended to hold.

Such a nutcracker device is employed as described hereinafter:

Firstly, the arms 1b are opened to a maximum, then the walnut 2 is introduced inside the jaw 1a. The walnut is positioned so that it comes into abutment against the anterior parts of the inner faces 5 constituting the jaw 1a, then an effort is exerted on the arms 1b, tending to bring them closer together, so that, under the effect of this force, of which the effect depends on the values of the lever arms, the nut 2 is crushed until the stops 7 of arms 1b come into contact with each other, thus limiting the stroke of the displacement.

The device of the present invention is particularly interesting in that, once the walnut 2 is positioned in the jaw 1a, it conserves its position without slide.

The qualities of elasticity of the elastomer 11 disposed in the recess 9 will be such that they enable it to ensure its adherence with the walnut 2 as long as the inner face 5 of the arms 1 is not in contact with the surface thereof, while allowing it to deform sufficiently in order to be positioned inside the recess 9, so that the effort is applied on the walnut 2 directly by the rigid arms 1.

Figure 5:
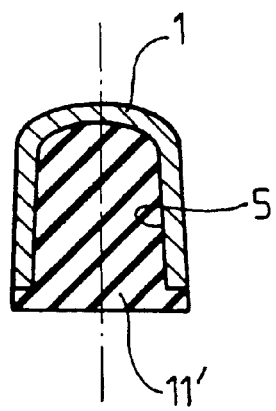
FIG. 5 is a partial view in section, in rest position, of one of the arms of a variant embodiment of a nutcracker device according to the invention.

In a variant embodiment of the invention, shown in FIG. 5, an elastomer 11' of greater rigidity is introduced in the recess 9 in the jaw 1a, which extends not only inside the recess 9, but also outside it, so as to cover the inner face 5 of the arms 1. In this way, in this embodiment of the invention, the effort transmitted by the jaw 1a to the shell which it is desired to crack, is done so directly by the elastomer.

Figure 6:
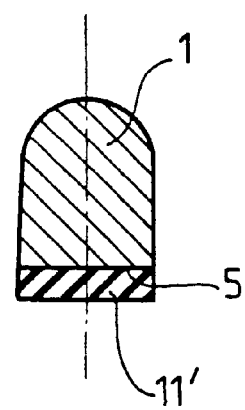
FIG. 6 is a partial view in section, in rest position, of one of the arms of a variant embodiment of a nutcracker device according to the invention.

As shown in FIG. 6, it is, of course, possible to fix the elastically deformable product 11' directly on the inner face of the arms 1, without a recess 9 being necessary. Fixation may in that case be effected by gluing, riveting, etc.

Figure 7:
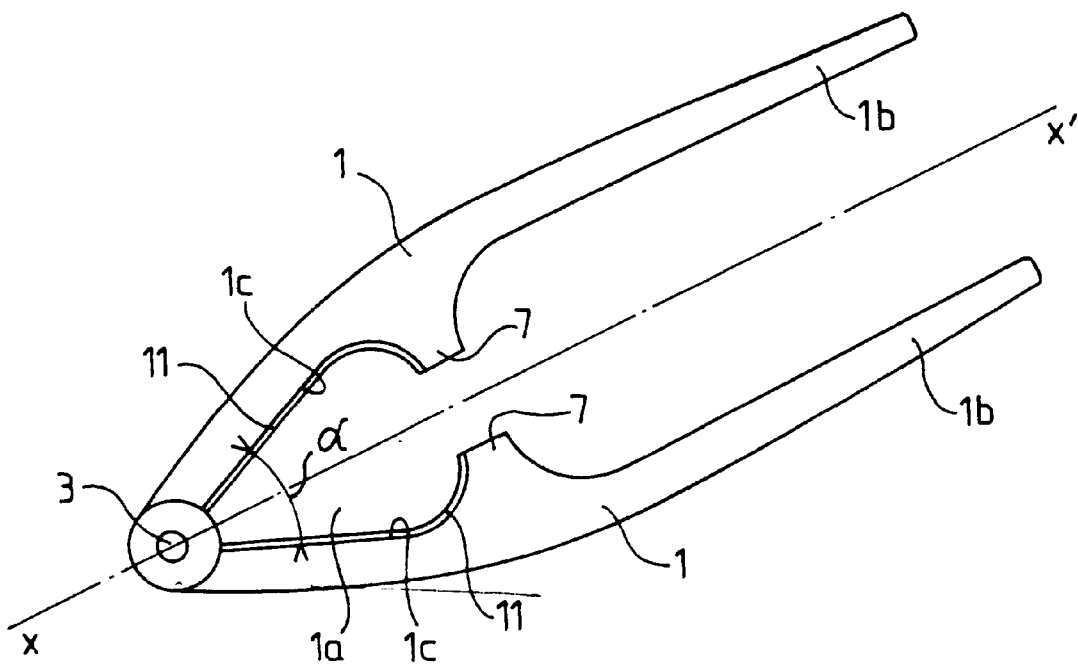
FIG. 7 is a plan view of a variant embodiment of a nutcracker device according to the invention.

In the variant embodiment of the nutcracker according to the invention shown in FIG. 7, the sides 1c of the jaw 1a, inside which the fruit of which it is desired to crack the shell is introduced, are substantially rectilinear in shape and form an angle α therebetween. Furthermore, this nutcracker may comprise a first set of stops, for example similar to stop elements 12, intended to limit the angle α of maximum opening presented by the two sides 1c and a second set of stops 7 intended to limit the angle of minimum opening of the two sides 1c.

In such an embodiment, the maximum value of the angle of opening α of these two sides will preferably be about 50°, and the minimum value will be of the order of 35°. In effect, it has been observed that, under these conditions, when, the nutcracker being in open position, the fruit was placed in abutment against the sides 1c, the effect of the closure of the nutcracker into position of minimum opening was to crack the shells of the fruit introduced, without destroying the interior thereof.

Interestingly, the stop elements may comprise elastic means which, in rest position, will place the arms 1 in position of maximum opening.

What is claimed is:

1. Device for cracking shells of a fruit, comprising:

two elements adapted to pivot from a rest position to a work position, by one of their respective ends, about a pivot axis of a transverse pin;

a fruit-gripping area adjacent to the pivot axis for receiving the fruit, whose shell it is desired to crack;

wherein at least an inner face of one of the elements has a hollowed out recess in which an elastically deformable product is housed; said elastically deformable product projecting, in said rest position, beyond the inner face; and said elastically deformable product retracting, in said work position, in the recess so that the inner face is in contact with the shell of the fruit.

2. The device according to claim 1, wherein, in said rest position, the elastically deformable product projects over a part of the width of said one of the elements.

3. The device according to claim 1, wherein said elastically deformable product is an elastomer.

4. The device according to claim 1, further comprising:

first stop means for limiting a maximum angle of opening of said elements; and second stop means for limiting a minimum angle of opening of said elements.

5. The device according to claim 4, wherein the fruit-gripping area has inner sides which are substantially rectilinear.

6. The device according to claim 5, wherein the maximum angle of opening between the sides is about 50°.

7. The device according to claim 5, wherein the minimum angle of opening between the sides is about 35°.

8. The device according to claim 4, further comprising elastic means, which, in the rest position, place the two elements in a position of maximum opening.

9. A nutcracker for cracking a shell of a nut, comprising:

a first arm extending in a longitudinal direction, and having a first end and an opposite second end;

a second arm extending in said longitudinal direction, and having a first end and an opposite second end;

a pivot pin for pivoting the first arm relative to the second arm about a pivot axis from a rest position to a work position, said pivot pin extending through the first end of the first arm and the first end of the second arm in a direction transversed to said longitudinal direction;

each arm having an anterior part adjacent said pivot axis defining a gripping area for receiving the nut, whose shell is to be cracked;

each anterior part having an inner face which has a hollowed out recess in which is housed an elastically deformable product;

said elastically deformable product projecting, in said rest position, beyond a corresponding inner face; and said elastically deformable product retracting, in said work position, in the recess so that each inner face is in contact with the shell of the nut.

10. The nutcracker according to claim 9, wherein the elastically deformable product is an elastomer.

11. The nutcracker according to claim 9, further comprising:

first stop means for limiting a maximum angle of opening of said arms; and second stop means for limiting a minimum angle of opening of said arms.

12. The nutcracker according to claim 11, wherein the maximum angle of opening between the arms is about 50°.

13. The nutcracker according to claim 11, wherein the minimum angle of opening between the arms is about 35°.

14. The nutcracker according to claim 11, further comprising elastic means, for placing the first and second arm in a position of maximum opening, when in the rest position.

* * * * *